(12) United States Patent
Yang et al.

(10) Patent No.: US 10,643,473 B2
(45) Date of Patent: May 5, 2020

(54) VEHICLE AND METHOD FOR COLLISION AVOIDANCE ASSISTANCE

(71) Applicants: HYUNDAI MOTOR COMPANY, Seoul (KR); KIA MOTORS CORPORATION, Seoul (KR)

(72) Inventors: Junho Yang, Yongin-si (KR); DongHun Yang, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 239 days.

(21) Appl. No.: 15/689,684

(22) Filed: Aug. 29, 2017

(65) Prior Publication Data
US 2018/0293893 A1 Oct. 11, 2018

(30) Foreign Application Priority Data
Apr. 11, 2017 (KR) .................. 10-2017-0046772

(51) Int. Cl.
| B60W 30/09 | (2012.01) |
| G08G 1/16 | (2006.01) |
| G01S 13/931 | (2020.01) |

(52) U.S. Cl.
CPC ............ *G08G 1/166* (2013.01); *B60W 30/09* (2013.01); *G08G 1/163* (2013.01); *G08G 1/165* (2013.01);
(Continued)

(58) Field of Classification Search
CPC ........ G08G 1/166; G08G 1/168; G08G 1/163; G08G 1/165; B60W 30/09;
(Continued)

(56) References Cited

U.S. PATENT DOCUMENTS

| 5,521,633 A * | 5/1996 | Nakajima | ............... B60Q 9/008 348/118 |
| 6,218,960 B1 * | 4/2001 | Ishikawa | ................ G08G 1/167 340/435 |

(Continued)

FOREIGN PATENT DOCUMENTS

KR  10-2010-0113371 A  10/2010

OTHER PUBLICATIONS

Taejae Jeon et al, Pedestrian Distance Estimation using a Single Camera Image, pp. 798-799 (2014), with English abstract.

*Primary Examiner* — Stephen Holwerda
(74) *Attorney, Agent, or Firm* — Brinks Gilson & Lione

(57) ABSTRACT

A vehicle for collision avoidance assistance may include: a camera to obtain an image of an object behind the vehicle, and obtain coordinates of a feature point spaced apart from the object, a controller, and a notification unit to output a collision warning. In particular, the controller sets an estimated value of a vector indicating a state of the vehicle based on coordinates of the vehicle, coordinates of the object, and the coordinates of the feature point, determine a predicted value of the estimated value of the vector based on a result of differentiating the estimated value of the vector with respect to time, correct the predicted value, determine the estimated value of the vector, and calculate a distance between the camera and the object to transmit a collision warning signal to the notification unit.

17 Claims, 9 Drawing Sheets

(52) U.S. Cl.
CPC ........ *G08G 1/168* (2013.01); *B60T 2201/022* (2013.01); *G01S 2013/9317* (2013.01); *G06T 2207/30252* (2013.01)

(58) Field of Classification Search
CPC ... G01S 2013/9317; G06T 2207/30252; B60T 2201/022
See application file for complete search history.

(56) References Cited

U.S. PATENT DOCUMENTS

| | | | |
|---|---|---|---|
| 2006/0055776 A1* | 3/2006 | Nobori | B60R 1/00 348/142 |
| 2008/0309516 A1* | 12/2008 | Friedrichs | G06T 7/223 340/935 |
| 2009/0074247 A1 | 3/2009 | Ma et al. | |
| 2009/0080701 A1 | 3/2009 | Meuter et al. | |
| 2009/0118900 A1* | 5/2009 | Adachi | B62D 15/027 701/33.4 |
| 2012/0022716 A1* | 1/2012 | Kitahama | G01C 21/34 701/1 |
| 2015/0073661 A1* | 3/2015 | Raisch | B62D 15/027 701/41 |
| 2015/0332089 A1 | 11/2015 | Zhang et al. | |

\* cited by examiner

VEHICLE AND METHOD FOR COLLISION AVOIDANCE ASSISTANCE

CROSS-REFERENCE TO RELATED APPLICATION

This application claims priority to and the benefit of Korean Patent Application No. 10-2017-0046772, filed on Apr. 11, 2017, which is incorporated herein by reference in its entirety.

FIELD

Forms of the present disclosure relate to a vehicle and a method for collision avoidance assistance.

BACKGROUND

The statements in this section merely provide background information related to the present disclosure and may not constitute prior art.

A vehicle is a device configured to carry a human being or an object to a destination while traveling on a road or tracks. The vehicle may move to various locations using at least one wheel installed on a body thereof. Examples of the vehicle include a three or four-wheeled vehicle, a two-wheeled vehicle such as a motorcycle, construction equipment, a bicycle, a train traveling on rails on a railroad, etc.

Research has been actively conducted on a vehicle with an advanced driver assistance system (ADAS) which actively provides information regarding a state of the vehicle, a state of a driver, and an ambient environment to decrease a burden on the driver and increase driver convenience.

One example of the ADAS installed in a vehicle is a parking collision-avoidance assistance (PCA) system. The PCA system determines a collision possibility between a vehicle and a pedestrian or an obstacle near the vehicle, and gives a warning or brakes the vehicle while the vehicle is running at a low speed.

SUMMARY

The present disclosure is directed to accurately estimating the distance between a vehicle and a pedestrian. In particular, when the pedestrian is located behind the vehicle and on a road with a slope or a gradient, the present disclosure may reduce or prevent a collision between the vehicle and the pedestrian when the vehicle moves backward.

Additional aspects of the present disclosure will be set forth in part in the description which follows and, in part, will be obvious from the description, or may be learned by practice of the present disclosure.

In accordance with one aspect of the present disclosure, a vehicle includes: a camera configured to obtain an image of an object behind the vehicle by photographing the object when the vehicle moves backward, and obtain coordinates of at least one feature point spaced a predetermined distance from the object, a controller configured to establish an estimated value of a vector indicating a state of the vehicle on the basis of coordinates of the vehicle, coordinates of the object, and the coordinates of the at least one feature point, determine a predicted value of the estimated value of the vector on the basis of a result of differentiating the estimated value of the vector with respect to time, correct the predicted value on the basis of the coordinates of the object and the coordinates of the at least one feature point obtained by the camera, determine the estimated value of the vector on the basis of the corrected predicted value, calculate a distance between the camera and the object on the basis of the determined estimated value of the vector, and transmit a collision warning signal on the basis of the calculated distance, and a notification unit configured to output a collision warning on the basis of the transmitted collision warning signal.

The camera may obtain coordinates of a road on which the object is located and coordinates of at least one feature point spaced a predetermined distance from the coordinates of the road.

The controller may establish a first coordinate system with a center which is the same as a center of an axle of a wheel of the vehicle at a position at which the camera starts sensing the object behind the vehicle when the vehicle is stopped and moves backward, establish a second coordinate system with a center, and establish a third coordinate system relative to the first coordinate system and based on a position of the camera. The center of the second coordinate system is established at a position where the center of the wheel is located close to the object with a predetermined distance after the vehicle moves backward.

The controller may determine the coordinates of the object and the coordinates of the at least one feature point with respect to the first coordinate system of the vehicle.

The controller may determine a roll, a pitch, and a yaw of the vehicle with respect to the first coordinate system of the vehicle.

The controller may determine a differential value of the estimated value of the vector on the basis of a backing up speed of the vehicle, a yaw, a distance of the axle of the wheel, and a steering angle.

The controller may determine the predicted value of the estimated value of the vector and a predicted value of a covariance matrix indicating the state of the vehicle on the basis of the determined differential value.

The controller may determine a measured value of a position vector of the object on the basis of the coordinates of the object obtained by the camera, determines a measured value of a position vector of the at least one feature point on the basis of the coordinates of the at least one feature point obtained by the camera, and determines a measured value of a height of the road on which the object is located on the basis of an average value of height components of the coordinates of the at least one feature point obtained by the camera.

The controller may determine the measured value of the position vector of the object with respect to the third coordinate system of the vehicle.

The controller may determine the measured value of the position vector of the at least one feature point with respect to the third coordinate system of the vehicle.

The controller may determine the measured value of the height of the road on which the object is located on the basis of the average value of the height components of the coordinates of the at least one feature point with respect to the first coordinate system of the vehicle.

The controller may correct an error of the predicted value of the estimated value of the vector and an error of the predicted value of the covariance matrix indicating the state of the vehicle on the basis of the measured value of the position vector of the object, the measured value of the position vector of the at least one feature point, and the measured value of the height of the road on which the object is located.

The controller may determine the coordinates of the object with respect to the second coordinate system, on the basis of the determined estimated value of the vector.

The controller may determine the coordinates of the object with respect to the third coordinate system on the basis of the coordinates of the object determined with respect to the second coordinate system and coordinates of the camera.

The controller may calculate the distance between the rear camera and the object from an inner product of the coordinates of the object determined with respect to the third coordinate system.

The controller may transmit the collision warning signal when the calculated distance between the camera and the object is less than a predetermined value.

The controller may transmit a control signal for decreasing a backing up speed of the vehicle when the calculated distance between the camera and the object is less than a predetermined value.

The camera may be a rear camera, and the rear camera may obtain coordinates of at least four feature points spaced a predetermined distance apart from the object, and the controller may determine the estimated value of the vector indicating the state of the vehicle on the basis of the coordinates of the vehicle, the coordinates of the object, and the coordinates of the at least four feature points, determines the predicted value of the estimated value of the vector on the basis of a result of differentiating the estimated value of the vector with respect to time, corrects the predicted value on the basis of the coordinates of the object and the coordinates of at least four feature point obtained by the rear camera, determines the estimated value of the vector on the basis of the corrected predicted value, calculates a distance between the rear camera and the object on the basis of the determined estimated value of the vector, and transmits a collision warning signal on the basis of the calculated distance.

In accordance with another aspect of the present disclosure, a method for controlling a vehicle includes: obtaining, by a rear camera, an image of an object behind a vehicle which is backing up by photographing the object; obtaining, by the camera, coordinates of at least one feature point spaced a predetermined distance from the object; establishing, by the controller, an estimated value of a vector representing a state of the vehicle on the basis of coordinates of the vehicle, coordinates of the object, and the coordinates of the at least one feature point; determining, by the controller, a predicted value of the estimated value of the vector on the basis of a result of differentiating the estimated value of the vector with respect to time; correcting, by the controller, the predicted value on the basis of the coordinates of the object and the coordinates of the at least one feature point obtained by the rear camera; determining, by the controller, the estimated value of the vector on the basis of the corrected predicted value; and calculating, by the controller, a distance between the rear camera and the object on the basis of the determined estimated value of the vector and transmitting a collision warning signal when the calculated distance is less than a predetermined value; and outputting, by a notification unit, a collision warning on the basis of the transmitted collision warning signal.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
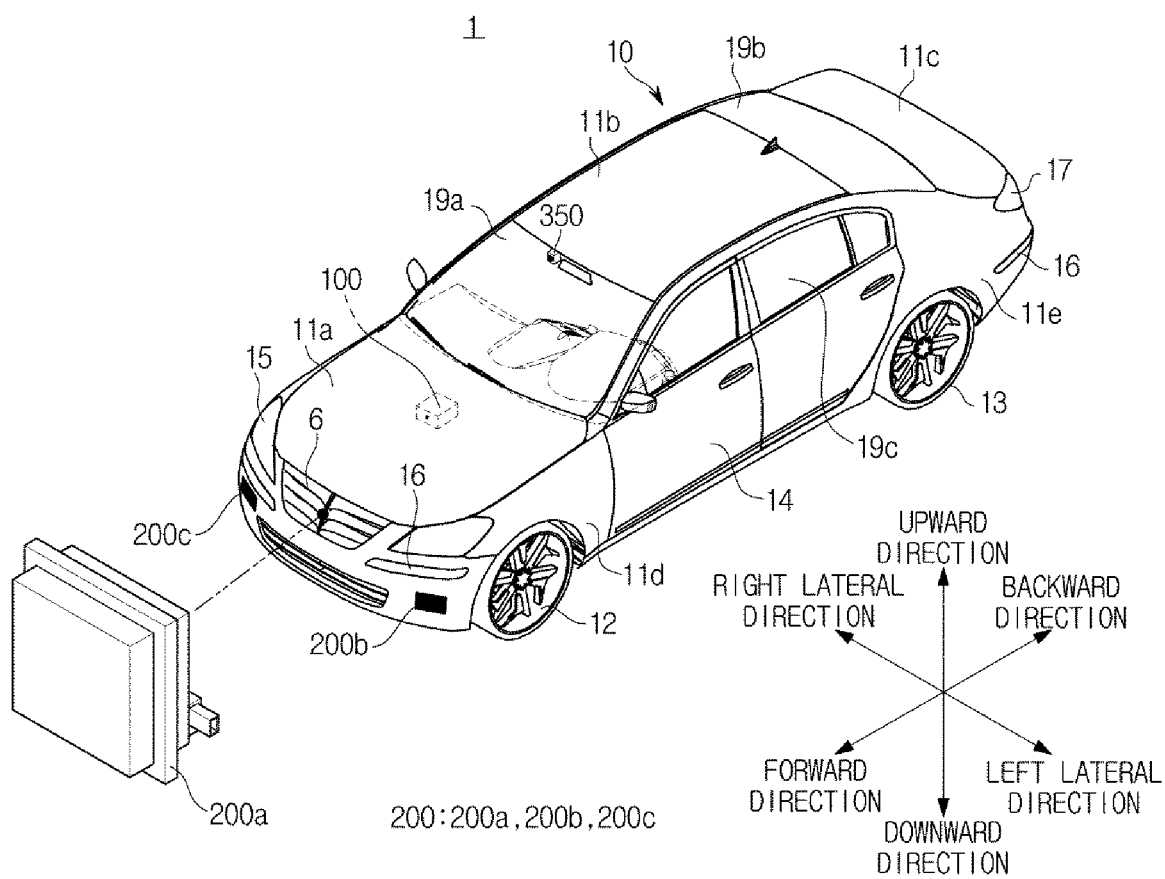
FIG. 1 is a schematic perspective view of the exterior of a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be understood that every element of the forms is not described herein, and general content in the technical field to which the present disclosure pertains or overlapping parts between forms are not described herein. As used herein, the terms "unit", "module", and "block" may be implemented as software or hardware, and a plurality of units, modules, or blocks may be integrated into one element or one unit, module, or block may include a plurality of elements in accordance with embodiments.

Throughout the present disclosure, when one element is referred to as being "connected to" another element, it should be understood to mean that the element may be connected directly or indirectly to the other element. When the element is indirectly connected to the other element, it should be understood that the element may be connected to the other element via a wireless communication network.

When one element is referred to as including another element, it should be understood that the presence or addition of one or more other elements is not precluded and the element may further include other elements, unless otherwise stated.

It should be understood that the terms "first," "second," etc., are used herein to distinguish one element from another element and the elements are not limited by these terms.

As used herein, the singular forms "a", "an" and "the" are intended to include the plural forms as well, unless the context clearly indicates otherwise.

Reference characters assigned to identify operations of a method are merely used for convenience of explanation. Thus, it should be understood that the reference characters do not indicate an order of the operations, and the operations may be performed in an order different from an order described herein unless a specific order is clearly stated in the content.

Hereinafter, operating principles and forms of the present disclosure will be described with reference to the accompanying drawings below.

Figure 2:
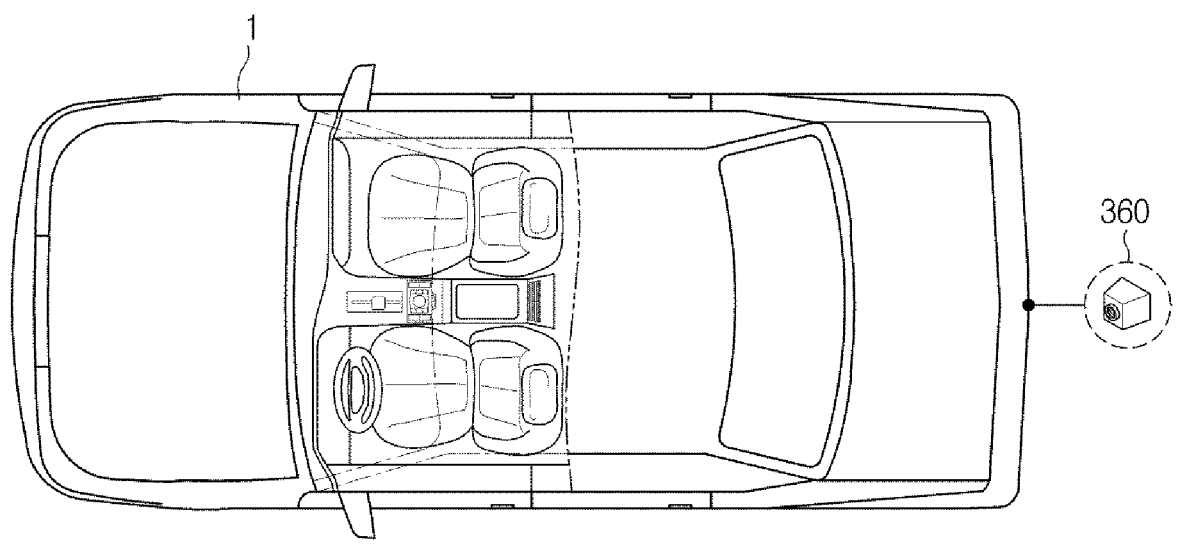
FIG. 2 illustrates a vehicle provided with a rear camera.
Figure 3:
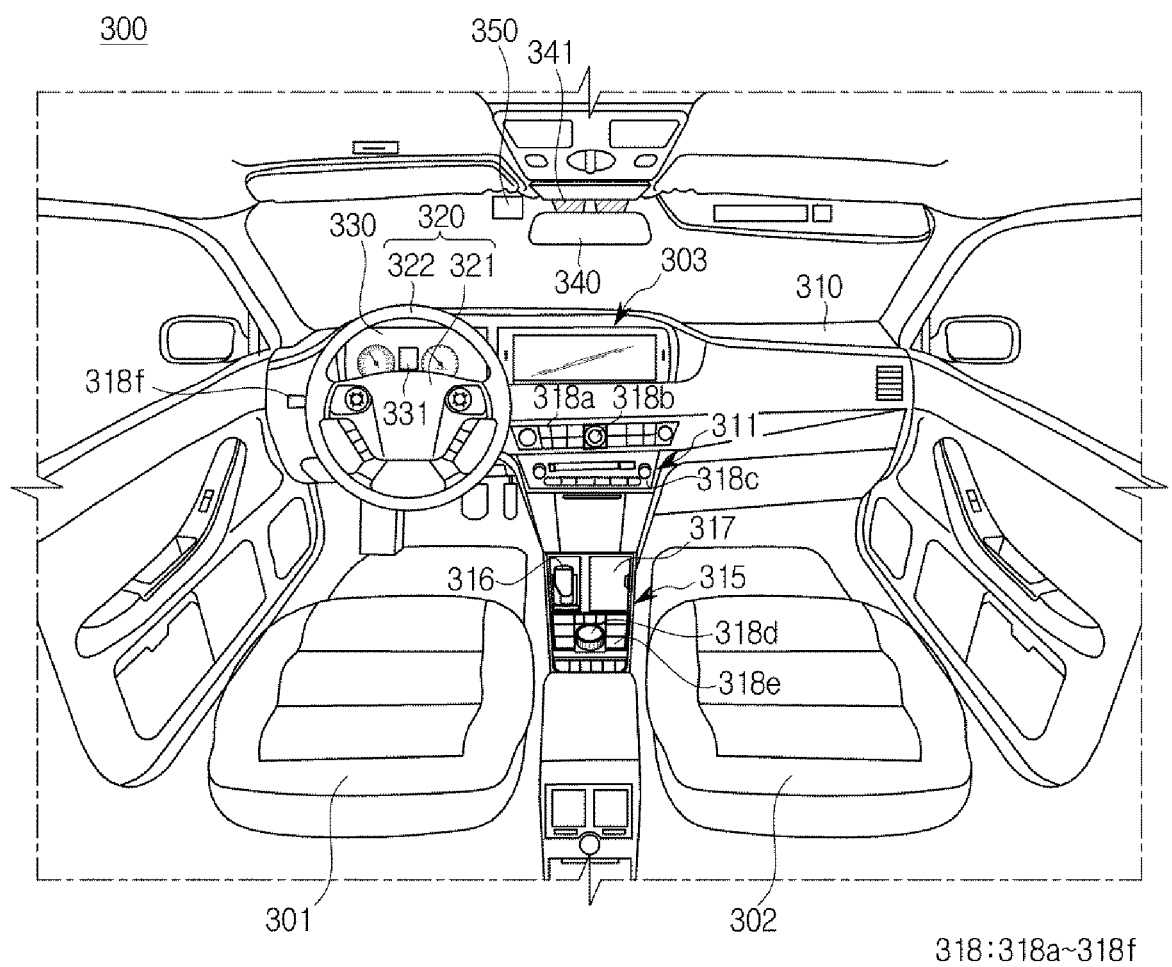
FIG. 3 illustrates the interior of a vehicle.
Figure 4:
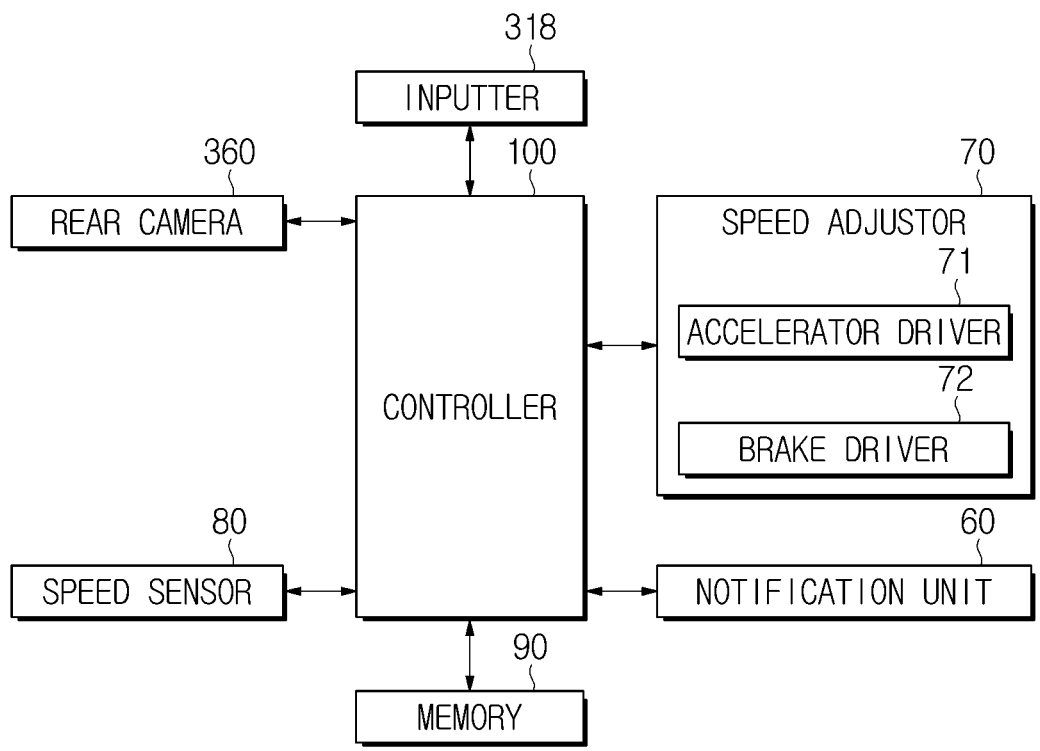
FIG. 4 is a control block diagram of a vehicle.

FIG. 1 is a schematic perspective view of the exterior of a vehicle in one form of the present disclosure. FIG. 2 illustrates a vehicle provided with a rear camera in one form of the present disclosure. FIG. 3 illustrates the interior of a vehicle in one form of the present disclosure. FIG. 4 is a control block diagram of a vehicle in one form of the present disclosure.

Generally, for convenience of explanation, a direction in which a vehicle 1 moves forward will be referred to as a forward direction and a left direction and a right direction will be determined with respect to the forward direction as illustrated in FIG. 1. When the forward direction is a 12 o'clock direction, a 3 o'clock direction or the vicinity thereof will be defined as the right direction and a 9 o'clock direction or the vicinity thereof will be defined as the left direction. A direction opposite to the forward direction will be referred to as a backward direction. A direction toward the bottom with respect to the vehicle 1 will be referred to as a downward direction, and a direction opposite to the downward direction will be referred to as an upward direction. Furthermore, a surface in the forward direction will be referred to as a front surface, a surface in the backward direction will be referred to as a rear surface, and a surface in a lateral direction will be referred to as a side surface. Among side surfaces, a side surface in the left direction will be defined as a left side surface and a side surface in the right direction will be defined as a right side surface.

Referring to FIG. 1, the vehicle 1 may include a body 10 forming the exterior of the vehicle 1, and wheels 12 and 13 for moving the vehicle 1.

The body 10 may include a hood 11a for protecting various devices, e.g., an engine, needed to drive the vehicle 1, a roof panel 11b forming an inner space, a trunk lid 11c covering a storage space, front fenders 11d and quarter panels 11e provided on lateral surfaces of the vehicle 1, and a plurality of doors 15 which are provided on the lateral surfaces of the body 10, and hinge-coupled to the body 10.

A front window 19a is provided between the hood 11a and the roof panel 11b to provide a field of view in front of the vehicle 1. A rear window 19b may be provided between the roof panel 11b and the trunk lid 11c to provide a field of view behind the vehicle 1. Lateral windows 19c may be provided at upper sides of the doors 15 to provide fields of view at sides of the vehicle 1.

A headlamp 15 may be provided in the front of the vehicle 1 to emit light in a traveling direction of the vehicle 1.

Turn signal lamps 16 may be provided in the front and rear of the vehicle 1 to indicate an intended traveling direction of the vehicle 1.

The intended traveling direction of the vehicle 1 may be indicated by flickering the turn signal lamps 16. Tail lamps 17 may be provided in the rear of the vehicle 1. The tail lamps 17 may be provided in the rear of the vehicle 1 to indicate a gear change state, a brake operating state, or the like of the vehicle 1.

As illustrated in FIGS. 1 and 3, at least one image capturing unit 350 may be provided in the vehicle 1. The at least one image capturing unit 350 may capture an image of the vicinity of the vehicle 1 while the vehicle 1 is traveling or stopped, sense an object in the vicinity of the vehicle 1, and obtain information regarding the type and location of the object. Examples of an object which may be photographed in the vicinity of the vehicle 1 include another vehicle, a pedestrian, a bicycle, etc. and further include a moving object or various types of stationary obstacles.

The at least one image capturing unit 350 may capture an image of an object near the vehicle 1, sense the type of the object by determining the shape of the image of the object through image recognition, and transmit information regarding the sensed type to a controller 100.

Although FIG. 3 illustrates that the at least one image capturing unit 350 is provided near a room mirror 340, the location of the at least one image capturing unit 350 is not limited and the at least one image capturing unit 350 may be installed on any location at which the inside or outside of the vehicle 1 may photographed to obtain image information.

The image capturing unit 350 may include at least one camera, and may include a three-dimensional (3D) space recognition sensor, a radar sensor, an ultrasonic sensor, or the like to more accurately capture an image.

The 3D space recognition sensor may include a Kinect (a RGB-D sensor), a time-of-flight (TOF) sensor (a structured light sensor), a stereo camera, or the like, but is not limited thereto and may include other devices having functions similar to those of the 3D space recognition sensor.

Referring to FIG. 2, the vehicle 1 in one form may include a rear camera 360. The rear camera 360 may be installed in the rear of the vehicle 1, and may capture an image of an object behind the vehicle 1 by photographing the object when a driver inputs a backup command by manipulating a gear. That is, the driver may check a state behind the vehicle 1 through the rear camera 360, thereby helping safe driving. An image captured by the rear camera 360 may be displayed through a display unit 303.

As will be described below, the rear camera 360 may obtain the coordinates of the road on which an object is located behind the vehicle 1, and obtain coordinates of feature points spaced a predetermined distance apart from the coordinates of the road.

In one form, the rear camera 360 may be installed above a rear bumper of the vehicle 1. The rear camera 360 may be any device capable of capturing an image and thus is not limited in terms of type, shape, installation location, etc. An operation and structure of the rear camera 360 will be described in detail with reference to FIG. 6 below.

Referring to FIG. 3, in a vehicle interior 300, a driver's seat 301, a passenger's seat 302, a dashboard 310, a steering device 320, and an instrument panel 330 are provided.

The dashboard 310 refers to a panel which divides the interior and an engine compartment of the vehicle 1 and in which various components needed for driving are installed. The dashboard 310 is provided in front of the driver's seat 301 and the passenger's seat 302. The dashboard 310 may include an upper panel, a center fascia 311, a gear box 315, etc.

The display unit 303 may be installed on the upper panel of the dashboard 310. The display unit 303 may provide various types of information in the form of an image to a driver of the vehicle 1 or a fellow passenger. For example, the display unit 303 may visually provide a map, weather information, news, various moving pictures or still pictures, various types of information related to a state or operation of the vehicle 1, for example, information regarding an air conditioner device, etc. The display unit 303 may provide a driver or a fellow passenger with a warning about a degree of risk. In detail, when the vehicle 1 conducts a lane change, the display unit 303 may provide a driver or the like with different warnings according to a degree of risk. The display unit 303 may be implemented using a general navigation device.

The display unit 303 may be provided in a housing integrally formed with the dashboard 310 such that only a display panel is exposed to the outside. Alternatively, the display unit 303 may be installed on a middle or bottom part of the center fascia 311 or may be installed on an inner side surface of a windshield (not shown) or an upper surface of the dashboard 310 using an additional support (not shown). In addition, the display unit 303 may be installed at other various locations which may be considered by a designer.

Various devices such as a processor, a communication module, a global positioning system (GPS) receiving module, a storage device, etc. may be installed in the dashboard 310. The processor installed in the vehicle 1 may be provided to control various electronic devices installed in the vehicle 1, or provided to perform a function of the controller 100 as described above. These devices may be implemented using various components such as a semiconductor chip, a switch, an integrated circuit, a resistor, a volatile or non-volatile memory, a printed circuit board, etc.

The center fascia 311 may be installed at a center part of the dashboard 310, in which input units 318*a* to 318*c* for inputting various commands related to the vehicle 1 may be provided. The input units 318*a* to 318*c* may be implemented using physical buttons, knobs, a touch pad, a touch screen, a stick type manipulation device, a trackball, or the like. A driver may control various operations of the vehicle 1 by manipulating the input units 318*a* to 318*c*.

The gear box 315 is provided at a bottom end of the center fascia 311 and between the driver's seat 301 and the passenger's seat 302. In the gear box 315, a gears 316, a storage box 317, various input units 318*d* to 318*e*, and the like may be provided. The input units 318*d* to 318*e* may be implemented using physical buttons, knobs, a touch pad, a touch screen, a stick type manipulation device, a trackball, or the like. The storage box 317 and the input units 318*d* to 318*e* may be omitted in some forms.

The steering device 320 and the instrument panel 330 are provided at a part of the dashboard 310 adjacent to the driver's seat.

The steering device 320 may be provided to be rotatable in a desired direction according to a driver's manipulation. The vehicle 1 may be steered as the front wheels 12 or the rear wheels 13 of the vehicle 1 are rotated according to a rotational direction of the steering device 320. In the steering device 320, spokes 321 connected to a rotating shaft and a steering wheel 322 coupled to the spokes 321 are provided. On the spokes 321, an input means for inputting various commands may be provided. The input means may be implemented using physical a button, a knob, a touch pad, a touch screen, a stick type manipulation device, a trackball, or the like. The steering wheel 322 may have a round shape for driver convenience but is not limited thereto. A vibration unit 201 of FIG. 4 may be installed in at least one of the spokes 321 and the steering wheel 322 to make at least one of the spokes 321 and the steering wheel 322 vibrate at a predetermined intensity under control from the outside. In one form, the vibration unit 201 may vibrate at various intensities according to a control signal from the outside. Thus, at least one of the spokes 321 and the steering wheel 322 may vibrate according to the control signal from the outside. The vehicle 1 may provide a driver with a haptic warning using the vibration of at least one of the spokes 321 and the steering wheel 322. For example, at least one of the spokes 321 and the steering wheel 322 may vibrate at an intensity corresponding to a degree of risk when the vehicle 1 conducts a lane change and may thus provide various warnings to a driver. In detail, as a degree of risk increases, at least one of the spokes 321 and the steering wheel 322 may vibrate at a higher intensity, thereby providing a higher level of warning to a driver.

A turn signal lamp input unit 318*f* may be provided at a rear part of the steering device 320. A user may input a signal for changing a driving direction or conduct a lane change through the turn signal lamp input unit 318*f* during driving of the vehicle 1.

The instrument panel 330 is provided to provide a driver with various types of information related to the vehicle 1, such as the speed of the vehicle 1, engine revolutions per minute (RPM), a remaining fuel amount, the temperature of engine oil, whether a turn signal lamp flickers, a distance traveled by the vehicle 1, etc. The instrument panel 330 may be implemented using a light, a scale plate, or the like, and may be implemented using a display panel in one form. When the instrument panel 330 is implemented using a display panel, the instrument panel 330 may provide a driver with not only the above-described information but also other various types of information such as fuel efficiency, whether various functions of the vehicle 1 are performed, etc. The instrument panel 330 may output different warnings and provide them to a driver according to a degree of risk of the vehicle 1. In detail, when the vehicle 1 conducts a lane change, the instrument panel 330 may provide a driver with different warnings according to a degree of risk corresponding to the lane change.

Referring to FIG. 4, the vehicle 1 in one form may include a notification unit 60 which outputs a collision warning indicating whether the vehicle 1 will collide with an object to a user, a speed adjustor 70 which adjusts a speed of the vehicle driven by a driver, a speed sensor 80 which senses a driving speed of the vehicle 1, a memory 90 which stores data related to controlling the vehicle 1, and the controller 100 which controls the elements of the vehicle 1 and a driving speed of the vehicle 1.

The notification unit 60 may output a collision warning indicating a risk of collision between the vehicle 1 and an object on the basis of a warning signal transmitted from the controller 100. That is, as will be described below, when the vehicle 1 is backing up, the notification unit 60 may sense an object such as a pedestrian behind the vehicle 1, and output a warning signal indicating a collision possibility to a user when a risk of collision is sensed on the basis of the distance between the vehicle 1 and the object, under control of the controller 100.

The notification unit 60 may be included in the display unit 303 or may be provided as a separate sound outputting element in the vehicle 1. The warning signal may be output in the form of a predetermined sound or utterance indicating a collision possibility.

The speed adjustor 70 may adjust the speed of the vehicle 1 driven by the driver. The speed adjustor 70 may include an accelerator driver 71 and a brake driver 72.

The accelerator driver 71 may receive a control signal from the controller 100 and increase the speed of the vehicle 1 by operating an accelerator. The brake driver 72 may receive a control signal from the controller 100 and decrease the speed of the vehicle 1 by operating a brake.

The controller 100 may increase or decrease the driving speed of the vehicle 1 on the basis of the distance between the vehicle 1 and an object and a predetermined reference distance stored in the memory 90 to increase or decrease the distance between the vehicle 1 and the object.

Furthermore, the controller 100 may calculate an estimated collision time until a collision between the vehicle 1 and an object based on a relative distance between the vehicle 1 the object, and a relative speed between the vehicle 1 the object. The controller 100 transmits a signal for controlling the driving speed of the vehicle 1 to the speed adjustor 70 on the basis of the calculated predicted collision time.

The speed adjustor 70 may adjust the driving speed of the vehicle 1 under control of the controller 100. The speed adjustor 70 may decrease the driving speed of the vehicle 1 when a degree of collision risk between the vehicle 1 and an object is high.

The speed adjustor 70 may adjust the driving speed of the vehicle 1 when the vehicle 1 moves forward or backward.

The speed sensor 80 may sense the speed of the vehicle 1 under control of the controller 100. That is, the speed sensor 80 may sense the speed of the vehicle 1 using the RPM of wheels of the vehicle 1 or the like. A unit of the driving speed of the vehicle 1 may be expressed in kph which means kilometers per hour.

The memory 90 may store various types of data related to controlling the vehicle 1. In detail, in one form, the memory 90 may store information regarding the driving speed, traveling distance, and traveling time of the vehicle 1, and store information regarding the type and location of an object sensed by the image capturing unit 350.

Furthermore, the memory 90 may store location information and speed information of an object sensed by a sensor 200, and store information regarding coordinates of a moving object which change in real time, a relative distance between the vehicle 1 and the object, and a relative speed between the vehicle 1 and the object.

In addition, the memory 90 may store data related to a formula and a control algorithm for controlling the vehicle 1 in one form. The controller 100 may transmit a control signal for controlling the vehicle according to the formula and the control algorithm.

The memory 90 may be implemented as, but is not limited to, at least one among a nonvolatile memory device (e.g., a cache, a read-only memory (ROM), a programmable ROM (PROM), an erasable programmable ROM (EPROM), an electrically erasable programmable ROM (EEPROM), or a flash memory), a volatile memory device (e.g., a random access memory (RAM)), and a storage medium (e.g., a hard disk drive (HDD) or a compact disc (CD)-ROM). The memory 90 may be a memory implemented as a chip separately from the processor described above and related to the controller 100, or may be a chip integrally formed with the processor.

Referring to FIGS. 1 and 4, at least one controller 100 may be included in the vehicle 1. The at least one controller 100 may electronically control elements related to an operation of the vehicle 1.

Figure 5:
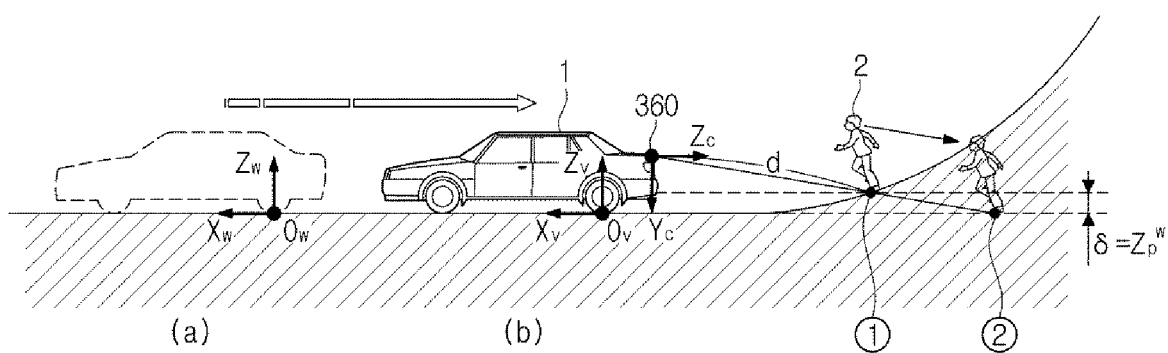
FIG. 5 is a diagram illustrating establishing a coordinate system to calculate a distance between a vehicle and a pedestrian behind the vehicle when the vehicle moves backward.

FIG. 5 is a diagram illustrating establishing a coordinate system to calculate the distance between a vehicle and a pedestrian behind the vehicle when the vehicle is backing up, in one form of the present disclosure.

Referring to FIG. 5, when the vehicle 1 moves backward, the controller 100 may establish a coordinate system representing a position of the vehicle 1 with respect to a position of the vehicle 1 at which the rear camera 360 starts sensing an object behind the vehicle 1, and a coordinate system representing a position of the vehicle 1 with respect to a position to which the vehicle 1 is backed up.

That is, in FIG. 5, when the vehicle 1 is located at a position (a), a coordinate system representing a position of the vehicle when the rear camera 360 starts sensing an object behind the vehicle 1 may be defined as a first coordinate system. A center $O_w$ of the first coordinate system may be at a center of an axle of a wheel of the vehicle 1.

The first coordinate system is defined with respect to a position at which the rear camera 360 of the vehicle 1 starts sensing an object behind the vehicle 1 and is thus a fixed coordinate system. As illustrated in FIG. 5, a forward direction and an upward direction of the vehicle 1 with respect to the center $O_w$ of the first coordinate system may be respectively defined as $X_w$ and $Z_w$, and a left direction of the vehicle 1 along the axle of the wheel of the vehicle 1 may be defined as $Y_w$ although not shown in FIG. 5.

When the vehicle 1 is backed up to a position (b), a coordinate system representing a position of the vehicle 1 may be defined as a second coordinate system. A center $O_v$ of the second coordinate system may be at the center of the axle of the wheel of the vehicle 1.

The second coordinate system is a coordinate system at a position to which the vehicle 1 is backed up close to an object behind the vehicle 1 to be spaced a predetermined distance apart from the object, and is thus a coordinate system which changes as the vehicle 1 moves backward. As illustrated in FIG. 5, a forward direction and an upward direction of the vehicle 1 with respect to the center $O_v$ of the second coordinate system may be respectively defined as $X_v$ and $Z_v$, and a left direction of the vehicle 1 along the axle of the wheel of the vehicle 1 may be defined as $Y_v$ although not shown in FIG. 5.

Furthermore, the controller 100 may set a coordinate system with respect to a position of the rear camera 360 of the vehicle 1. This coordinate system may be defined as a third coordinate system.

As illustrated in FIG. 5, the third coordinate system may also change as the vehicle 1 moves. A direction of an optical axis and a downward direction of the rear camera 360 with respect to a center $O_c$ of the third coordinate system based on the position of the rear camera 360 may be respectively defined as $Z_c$ and $Y_c$, and a left direction of the vehicle 1 with respect to the center $O_c$ may be defined as $X_c$ although not shown in FIG. 5.

The rear camera 360 of the vehicle 1 may obtain an image of an object behind the vehicle 1 by photographing the object. The type of the object is not limited but it will be assumed below that the object behind the vehicle 1 is a pedestrian 2.

As illustrated in FIG. 5, the pedestrian 2 may be located on the road with a slope or a gradient. That is, when the pedestrian 2 is located at a position ①, the controller 100 should precisely calculate a distance (d) from the rear camera 360 to the pedestrian 2 on the basis of an image of the pedestrian 2 captured by the rear camera 360 but may fail to recognize that the road has the gradient and may thus determine that the pedestrian 2 is located at a position ②.

According to the vehicle 1 and a method of controlling the same, a position of the pedestrian 2 on the road with the slope or the gradient may be accurately determined and the distance (d) from the camera 360 to the pedestrian 2 may be precisely calculated, thereby inhibiting or preventing a collision between the vehicle 1 which is backing up and the pedestrian 2.

As illustrated in FIG. 5, if the pedestrian 2 is located on a slope, when a height of the slope on which the pedestrian 2 is located with respect to a flat land is δ, δ=$Z_p^w$, as will be described in detail in the following form.

Figure 6:
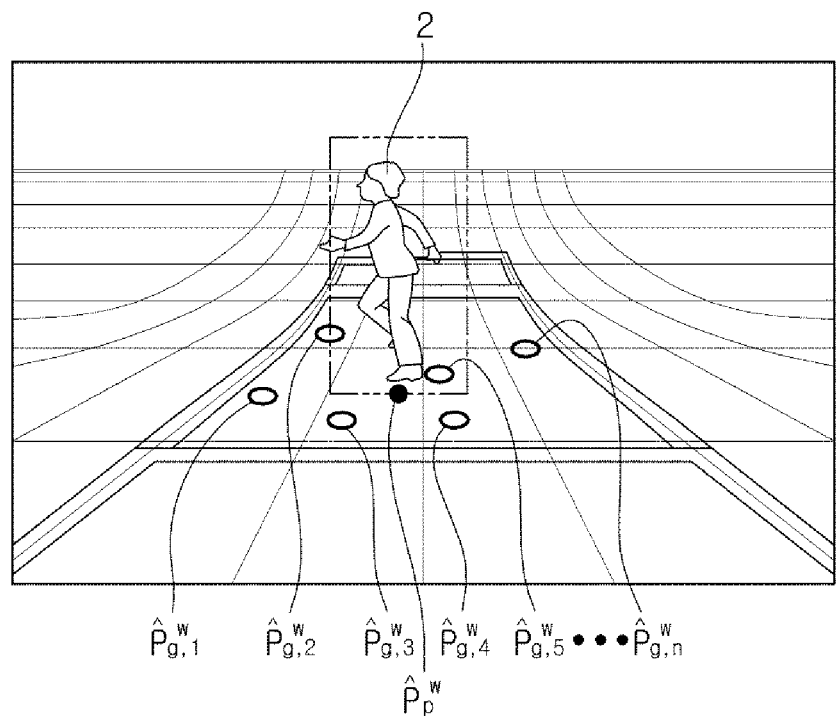
FIG. 6 is a diagram illustrating obtaining coordinates of the road on which a pedestrian is located and coordinates of at least one feature point in the vicinity of the pedestrian, performed by a rear camera.
Figure 7:
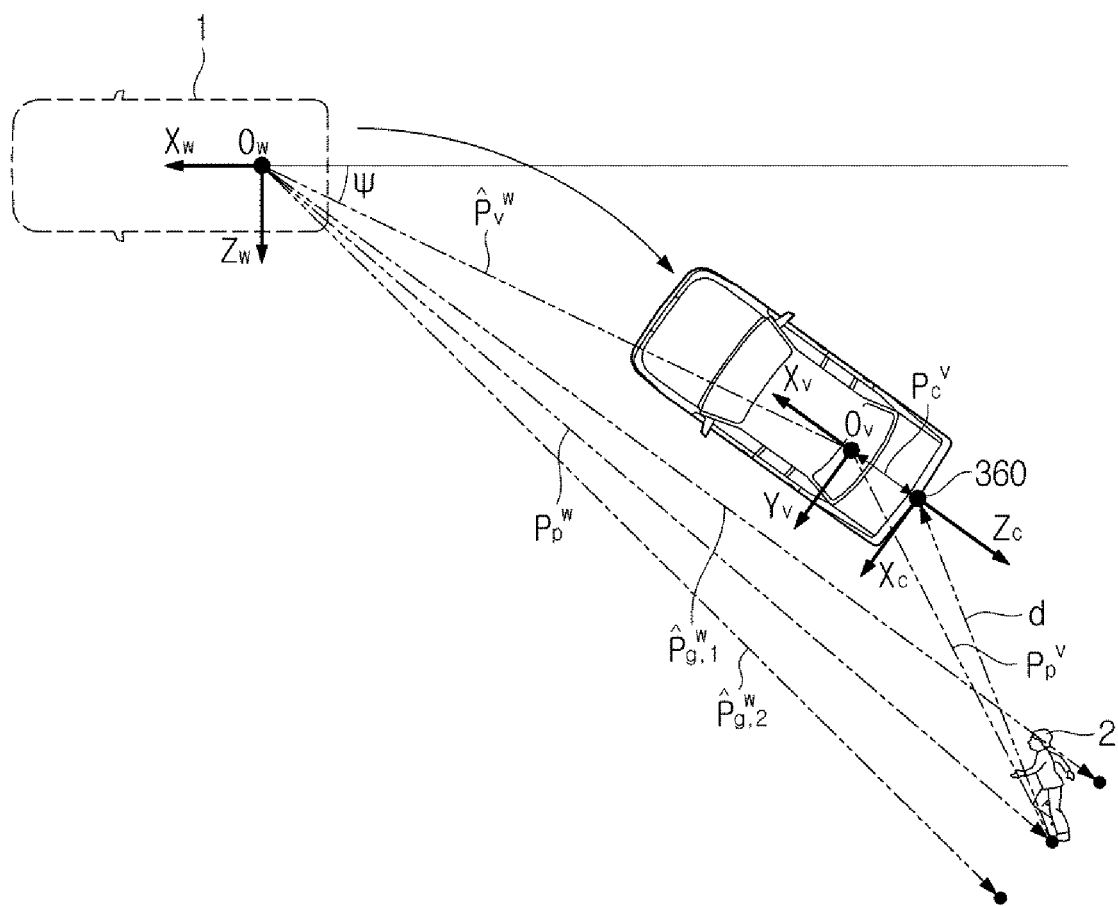
FIG. 7 is a diagram illustrating the relationship between a vehicle and a pedestrian for determining a distance between the vehicle and the pedestrian.
Figure 8:
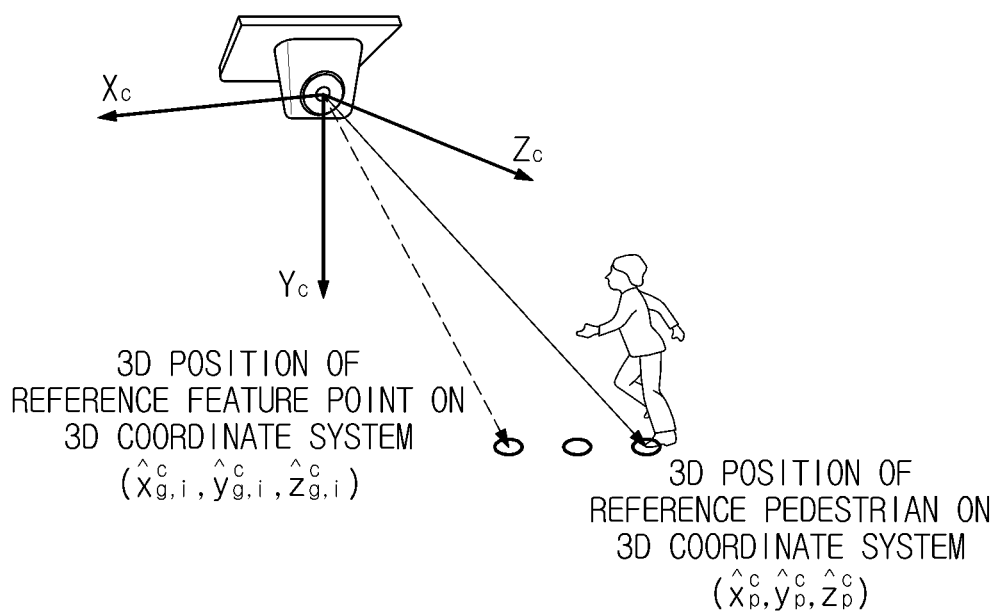
FIG. 8 is a conceptual diagram regarding a distance between a rear camera and a pedestrian.

FIG. 6 is a diagram illustrating obtaining coordinates of the road on which a pedestrian is located and coordinates of at least one feature point in the vicinity of the pedestrian, performed by a rear camera, in one form. FIG. 7 is a diagram illustrating the relationship between a vehicle and a pedestrian for determining a distance between the vehicle and the pedestrian, in one form. FIG. 8 is a conceptual diagram regarding a distance between a rear camera and a pedestrian, in one form.

The rear camera 360 may obtain an image of the pedestrian 2 behind the vehicle 1 by photographing the pedestrian 2. The rear camera 360 may obtain coordinates of a center point on the road on which the pedestrian 2 is located on the basis of the image of the pedestrian 2, and obtain coordinates of at least one feature point spaced a predetermined distance from the obtained coordinates of the center point on the road. In this case, the rear camera 360 may obtain coordinates of at least four feature points.

The forms set forth herein may be performed on the assumption that at least one feature point is present, but a case in which the number of feature points is four or more will be described as an example to particularly explain a method of implementing the present disclosure. However, the number of feature points is not limited in implementing the present disclosure.

A center point of the position of the pedestrian 2 and a feature point in the vicinity of the pedestrian 2 may be extracted from the image captured by the rear camera 360 using various known techniques. That is, these points may be extracted using a texture-based coordinate extraction method, and a distance to the pedestrian 2 may be measured by assigning distance values to pixel positions in a vertical direction in an image captured by the rear camera 360 and using the distance value assigned to the position of a pixel corresponding to a foot of the pedestrian 2.

The controller 100 may set an estimated value of a vector indicating a state of the vehicle 1 on the basis of the center point of the pedestrian 2 in the image captured by the rear camera 360 and at least four feature points.

That is, the controller 100 may establish 3D coordinates of the pedestrian 2 with respect to the first coordinate system of the vehicle 1 and 3D coordinates of at least four feature points in the form of vectors.

Referring to FIG. 6, the controller 100 may determine 3D coordinates of a center point at the position of the pedestrian 2 with respect to the first coordinate system to be $\hat{P}_p^w$. $\hat{P}_p^w$ is an element for setting an estimated value of a vector indicating a state of the vehicle 1.

The state of the vehicle 1 means a distance and position of the vehicle 1 relative to objects, such as the pedestrian 2, near the vehicle 1 on the basis of a position and movement of the vehicle 1.

In this case, P represents the position of the pedestrian 2, p represents the pedestrian 2, and w represents a world defined as the first coordinate system used as a reference.

$\hat{P}_p^w$ is in the form of the vector indicating the 3D coordinates of the pedestrian 2 and may be thus defined as $$\begin{bmatrix} x_p^w \\ y_p^w \\ z_p^w \end{bmatrix}$$

with respect to an x-coordinate, a y-coordinate, and a z-coordinate.

Referring to FIG. 6, the controller 100 may determine the 3D coordinates of the at least four feature points spaced a predetermined distance from the center point at the position of the pedestrian 2 with respect to the first coordinate system to be $\hat{P}_g^w$. $\hat{P}_g^w$ is also an element for setting an estimated value of the vector indicating the state of the vehicle 1. In this case, g may be defined as the ground.

$\hat{P}_g^w$ is in the form of the vector of the 3D coordinates of the at least four feature points and may be thus defined as $$\begin{bmatrix} x_g^w \\ y_g^w \\ z_g^w \end{bmatrix}$$

with respect to the x-coordinate, the y-coordinate, and the z-coordinate of one of the at least four feature points. Furthermore, since there may be a plurality of feature points, when n feature points are obtained as illustrated in FIG. 6, 3D coordinates of the n feature points may be determined to be $\hat{P}_{g,1}^w, \hat{P}_{g,2}^w, \hat{P}_{g,3}^w, \hat{P}_{g,4}^w, \hat{P}_{g,5}^w, \ldots, \hat{P}_{g,n}^w$.

The feature points are points close to the pedestrian 2 located on the slope and may thus have a height equal to the slope on which the pedestrian 2 is located with respect to a flat plane. The number of feature points, the coordinates of which are obtained as described above, is not limited.

In order to set the estimated value of the vector indicating the state of the vehicle 1, the controller 100 may establish, in the form of a vector, 3D coordinates of the vehicle 1 at a position to which the vehicle 1 is backed up with respect to the first coordinate system of the vehicle 1. Referring to FIG. 5, if the vehicle 1 is located at the position (a), a 3D position of the vehicle 1 when the vehicle 1 is backed up to the position (b) with respect to the first coordinate system when the rear camera 360 starts sensing an object behind the vehicle 1 is set in the form of a vector.

That is, the controller 100 may determine 3D coordinates of the vehicle 1 at a position to which the vehicle 1 is backed up with respect to the first coordinate system to be $\hat{P}_v^w$. $\hat{P}_v^w$ is an element for setting an estimated value of the vector indicating the state of the vehicle 1. In this case, v represents the vehicle 1.

$\hat{P}_v^w$ is in the form of a vector of the 3D coordinates of the vehicle 1 at the position to which the vehicle 1 is backed up and is thus defined as $$\begin{bmatrix} x_v^w \\ y_v^w \\ z_v^w \end{bmatrix}$$

with respect to an x-coordinate, a y-coordinate, and a z-coordinate.

In order to set the estimated value of the vector indicating the state of the vehicle 1, the controller 100 may set an attitude of the vehicle 1 at the position to which the vehicle 1 is backed up with respect to the first coordinate system of the vehicle 1 . In this case, the attitude of the vehicle 1 includes a roll, pitch, and yaw of the vehicle 1. The roll refers to rotation around an axis on a horizontal plane perpendicular to a moving direction of the vehicle 1. The pitch refers to rotation around an axis on a horizontal plane parallel to the moving direction of the vehicle 1. The yaw refers to rotation around an axis on a vertical plane perpendicular to the moving direction of the vehicle 1.

The roll, the pitch, and the yaw refer to rotation angles. Thus, the controller 100 may determine the attitude of the vehicle 1 at the position to which the vehicle 1 is backed up with respect to the first coordinate system to be $\hat{\theta}_v^w$. $\theta_v^w$ is an element for setting an estimated value of the vector indicating the state of the vehicle 1.

$\hat{\theta}_v^w$ is in the form of vector of the attitude of the vehicle 1 at the position to which the vehicle 1 is backed up, and may be defined as $$\begin{bmatrix} 0 \\ 0 \\ \psi \end{bmatrix}$$

when it is assumed that the roll and pitch of the vehicle 1 are zero. In this case, $\psi$ means a yaw angle.

The controller 100 may set an estimated value of the vector indicating the state of the vehicle 1 on the basis of the 3D coordinates of the vehicle 1, the attitude of the vehicle 1, the 3D coordinates of the pedestrian 2, and the 3D coordinates of the at least four feature points which are set as described above. When the estimated value of the vector is the relationship between the estimated value of the vector and the elements described above may be expressed by Equation 1 below.

$$\hat{x} \equiv \begin{pmatrix} \hat{P}_v^w \\ \hat{\theta}_v^w \\ \hat{P}_p^w \\ \hat{P}_g^w \end{pmatrix} \quad [\text{Equation 1}]$$

The controller 100 may determine a motion model of the vector indicating the state of the vehicle 1 by differentiating the estimated value $\hat{x}$ of the vector with respect to time.

When the motion model of the vector is $f(\hat{x}, t)$, the motion model may be expressed as a result of differentiating the estimated value $\hat{x}$ of the vector according to Equation 1 with respect to time.

The controller 100 may differentiate the vector $\hat{P}_v^w$ of the 3D coordinates of the vehicle 1 with respect to the first coordinate system with respect to time. In this case, the motion model of the vector may be determined to be $f(\hat{x}, t)$ on the basis of a moving speed v of the vehicle 1, a yaw angle $\psi$ by which the vehicle 1 rotates while backing up, a distance l of the axle of the wheel, and a steering angle $\alpha$.

The vector of the coordinates $\hat{P}_v^w$ of the 3D position of the vehicle 1 at the position to which the vehicle 1 is backed up may be defined as $$\begin{bmatrix} x_v^w \\ y_v^w \\ z_v^w \end{bmatrix}$$

as described above. Thus, when the vector $\hat{P}_v^w$ is differentiated with respect to time, a result of differentiating the vector $\hat{P}_v^w$ with respect to time may be expressed as $$\begin{bmatrix} v\cos\psi\cos\psi \\ v\sin\psi\cos\psi \\ 0 \end{bmatrix}.$$

That is, a result of differentiating the 3D coordinates of the vehicle 1 with respect to time is 0 on an assumption that $z_v^w$ does not change with respect to height in the 3D coordinates of the vehicle 1.

Since the attitude $\hat{\theta}_v^w$ of the vehicle 1 at the position to which the vehicle 1 is backed up with respect to the first coordinate system may be defined as $$\begin{bmatrix} 0 \\ 0 \\ \psi \end{bmatrix}$$

as described above, it may be expressed as $$\begin{bmatrix} 0 \\ 0 \\ vl^{-1}\sin\alpha \end{bmatrix}$$

when the attitude $\hat{\theta}_v^w$ is differentiated with respect to time.

The coordinates $\hat{P}_p^w$ of the 3D position of the pedestrian 2 may be expressed as $$\begin{bmatrix} x_p^w \\ y_p^w \\ z_p^w \end{bmatrix}$$

as described above, and may be thus expressed as $$\begin{bmatrix} 0 \\ 0 \\ 0 \end{bmatrix}$$

when they are differentiated with respect to time since it is assumed that the pedestrian 2 stays still in terms of a mathematical concept.

As the coordinates $\hat{P}_g^w$ of the 3D positions of the at least four feature points may be expressed as $$\begin{bmatrix} x_g^w \\ y_g^w \\ z_g^w \end{bmatrix}$$

as described above, each of the at least four feature points may be expressed as $$\begin{bmatrix} 0 \\ 0 \\ 0 \end{bmatrix}$$

when it is differentiated with respect to time because it is assumed that the at least four feature points are still.

Thus, the controller 100 may determine the motion model $f(\hat{x}, t)$ of the vector, as expressed in Equation 2 below.

$$f(\hat{x}, t) = \begin{pmatrix} v\cos\psi\cos\psi \\ v\sin\psi\cos\psi \\ 0 \\ 0_{2\times 1} \\ vl^{-1}\sin\alpha \\ 0_{3\times 1} \\ 0_{3n\times 1} \end{pmatrix} \quad \text{[Equation 2]}$$

In this case, $0_{3n\times 1}$ represents a case in which there are n feature points.

When the vehicle 1 is backing up, the controller 100 may use a Kalman filter as a tracking filter to determine a predicted value of the estimated value $\hat{x}$ of the vector set to indicate the state of the vehicle 1 as described above.

That is, the controller 100 may determine a predicted value of the estimated value $\hat{x}$ of the vector indicating the state of the vehicle 1 and a predicted value of a covariance matrix $P(\hat{x}, t)$ indicating the state of the vehicle 1 on the basis of Equations 3 and 4 below.

$$\dot{\hat{x}} = f(\hat{x}, t) \quad \text{[Equation 3]}$$

$$\dot{P}(\hat{x}, t) = F(\hat{x}, t) P(\hat{x}, t) + P(\hat{x}, t) F(\hat{x}, t)^T + W \quad \text{[Equation 4]}$$

In this case, $F(\hat{x}, t)$ may be calculated using a Jacobian of $f(\hat{x}, t)$, and W represents a process covariance. The determining of the predicted value of the estimated value $\hat{x}$ of the vector and the predicted value of the covariance matrix $P(\hat{x}, t)$ indicating the state of the vehicle 1 using the Kalman filter is performed for a short time period than a correction operation which will be described below.

The controller 100 may determine a measured value $h_p(x,t)$ of a position vector of the pedestrian 2 on the basis of coordinates of the pedestrian 2 obtained by the rear camera 360. The controller 100 may determine measured values $h_g(x,t)$ of position vectors of at least four feature points on the basis of coordinates of the at least four feature points obtained by the rear camera 360. The controller 100 may determine a measured value $z_p^w$ of a height of the road on which the pedestrian 2 is located on the basis of an average value of height components with respect to coordinates of the at least four feature points obtained by the rear camera 360.

In this case, the controller 100 may determine a measured value of the position vector of the pedestrian 2, measured values of the position vectors of the at least four feature points, and a measured value of the height of the road on which the pedestrian 2 is located on the basis of the third coordinate system of the rear camera 360.

That is, the controller 100 may determine a measured value (h(x,t) of a position vector for estimating the distance between the vehicle 1 and the pedestrian 2, as expressed in Equation 5 below, based on a measured value of the position vector of the pedestrian 2 obtained by the rear camera 360, measured values of the position vectors of the at least four feature points, and a measured value of the height of the road on which the pedestrian 2 is located.

$$h(x, t) = \begin{bmatrix} h_p(x, t) \\ h_g(x, t) \\ z_p^w \end{bmatrix} \quad \text{[Equation 5]}$$

In this case, the controller 100 may determine a measured value $h_p(x,t)$ of the position vector of the pedestrian 2, as expressed in Equation 6 below.

$$h_p(x, t) = \begin{pmatrix} u_p / f_u \\ v_p / f_v \end{pmatrix} \quad \text{[Equation 6]}$$

That is, the controller 100 may determine coordinates of the pedestrian 2 in an image of the pedestrian 2 captured by the rear camera 360 to be $(u_p, v_p)$ by defining a vertical coordinate and a horizontal coordinate. Equation 6 defines a measured value of the position vector of the pedestrian 2 by dividing the coordinates of the pedestrian 2 by a focal distance $(f_u, f_v)$ based on pixels of the rear camera 360.

Furthermore, the controller 100 may determine measured values $h_g(x,t)$ of position vectors of at least four feature points, as expressed in Equation 7 below.

$$h_{g,i}(\hat{x}, t) = \begin{pmatrix} u_{g,i} / f_u \\ v_{g,i} / f_v \end{pmatrix} \quad \text{[Equation 7]}$$

That is, the controller 100 may define coordinates of each of n feature points in an image of at least four feature points captured by the rear camera 360 to be vertical coordinates and horizontal coordinates, and determine coordinates of an $i^{th}$ feature point among the n features points to be $(u_{g,i}, v_{g,i})$. Equation 7 defines measured values of the position vectors of the at least four feature points by dividing the coordinates of the $i^{th}$ feature point by a focal distance $(f_u, f_v)$ based on pixels of the rear camera 360.

The controller 100 may determine a measured value $z_p^w$ of a height of the road on which the pedestrian 2 is located, as expressed in Equation 8 below.

$$z_p^w = \Sigma_{i=1}^n z_{g,i}^w / n \quad \text{[Equation 8]}$$

The controller 100 may determine the measured value $z_p^w$ of the height of the road on which the pedestrian 2 is located, based on an average value of height components with respect to the coordinates of the at least four feature points obtained by the rear camera 360. In this case, the controller 100 may determine the measured value $z_p^w$ of the height of the road according to an average of height components among 3D coordinate components of feature points with respect to the first coordinate system.

In this case, $z_g^w$ corresponds to a height component among the 3D coordinates of the feature points as described above.

The controller 100 may determine a measurement model for estimating the distance between the vehicle 1 and the pedestrian 2 on the basis of the measured value h(x,t) of the position vector of the pedestrian 2 determined according to Equation 5.

That is, the controller 100 may determine the measurement model of a position vector for estimating the distance between the vehicle 1 and the pedestrian 2 on the basis of a measurement model of the position vector of the pedestrian 2 obtained by the rear camera 360, a measurement model of the position vectors of the at least four feature points, and a measurement model of the height of the road on which the pedestrian 2 is located, as expressed in Equation 9 below.

$$h(\hat{x}, t) = \begin{bmatrix} h_p(\hat{x}, t) \\ h_g(\hat{x}, t) \\ \hat{z}_p^w \end{bmatrix}$$ [Equation 9]

In this case, the controller 100 may determine a measurement model $h_p(\hat{x},t)$ of the position vector of the pedestrian 2, as expressed in Equation 10 below.

$$h_p(\hat{x}, t) = \begin{pmatrix} \hat{x}_p^c / \hat{z}_p^c \\ \hat{y}_p^c / \hat{z}_p^c \end{pmatrix}$$ [Equation 10]

That is, as illustrated in FIG. 8, the controller 100 may determine the measurement model $h_p(\hat{x},t)$ of the position vector of the pedestrian 2 on the basis of 3D coordinates $(\hat{x}_p^c, \hat{y}_p^x, \hat{z}_p^c)$ of the pedestrian 2 with respect to the third coordinate system, as expressed in Equation 10.

The controller 100 may determine the measurement model $h_g(\hat{x},t)$ of the position vectors of the at least four feature points, as expressed in Equation 11 below.

$$h_p(\hat{x}, t) = \begin{pmatrix} \hat{x}_p^c / \hat{z}_p^c \\ \hat{y}_p^c / \hat{z}_p^c \end{pmatrix}$$ [Equation 11]

That is, as illustrated in FIG. 8, the controller 100 may determine the measurement model $h_g(\hat{x},t)$ of the position vectors of the at least four feature points on the basis of the 3D coordinates $x_{g,i}^c, y_{g,i}^c, z_{g,i}^c$ of the at least four feature points with respect to the third coordinate system, as expressed in Equation 11.

Furthermore, the controller 100 may determine a measurement model of the height of the road on which the pedestrian 2 is located to be based on the height component of the 3D coordinates $\hat{x}_p^w, \hat{y}_p^w, \hat{z}_p^w$ of the pedestrian 2 with respect to the first coordinate system.

The controller 100 may correct an error of a predicted value of the estimated value $\hat{x}$ of the vector indicating the state of the vehicle 1 determined by Equations 3 and 4 and an error of a predicted value of the covariance matrix $P(\hat{x},t)$ indicating the state of the vehicle 1, based on the measurement model $h_p(\hat{x},t)$ of the position vector of the pedestrian 2, the measurement model $h_g(\hat{x},t)$ of the position vectors of the at least four feature points, and the measurement model $\hat{z}_p^w$ of the height of the road on which the pedestrian 2 is located, which are described above.

The controller 100 may calculate a Kalman gain $K(\hat{x},t)$ of the Kalman filter using Equations 12 to 14 below, and use the Kalman gain $K(\hat{x},t)$ as a weight with respect to the difference between a measured value and a predicted value.

$$K(\hat{x},t_k) = P(\hat{x},t_k)H(\hat{x},t_k)^T(H(\hat{x},t_k)P(\hat{x},t_k)H(\hat{x},t_k)^T+V)^{-1}$$ [Equation 12]

$$\hat{x}^+ = \hat{x} + K(\hat{x},t_k)(y - h(\hat{x},t_k))$$ [Equation 13]

$$P(\hat{x}^+,t_k) = (I - K(\hat{x},t_k)H(\hat{x},t_k))P(\hat{x},t_k)$$ [Equation 14]

Here, $K(\hat{x},t)$ represents the Kalman gain, and V represents a measurement covariance.

The controller 100 may correct the estimated value s of the vector indicating the state of the vehicle 1 to be $\hat{x}^+$ by reflecting a measured value $h(\hat{x},t)$ of a position vector for estimating the Kalman gain $K(\hat{x},t)$ proportional to the distance between the vehicle 1 and the pedestrian 2 and an error of the measurement model $h(\hat{x},t)$.

Furthermore, the controller 100 may correct the covariance matrix $P(\hat{x},t)$ indicating the state of the vehicle 1 to be $P(\hat{x}^+,t_k)$. In this case, $H(\hat{x},t)$ may be calculated using a Jacobian of $h(\hat{x},t)$.

The controller 100 may accurately estimate the distance between the vehicle 1 and the pedestrian 2 by updating a predicted value of the estimated value $\hat{x}$ of the vector indicating the state of the vehicle 1 using the measured value h(x,t) of the position vector for estimating the distance between the vehicle 1 and the pedestrian 2 and a measurement covariance and by correcting an error of the predicted value of the estimated value of the vector and an error of a predicted value of the covariance matrix indicating the state of the vehicle 1.

That is, the controller 100 may determine the estimated value $\hat{x}$ of the vector indicating the state of the vehicle 1 which is set as described above, through the above-described correction operation.

The controller 100 may estimate coordinates $\hat{P}_p^v$ of the pedestrian 2 with respect to the second coordinate system on the basis of the determined estimated value $\hat{x}$ of the vector.

Referring to FIG. 7, the estimated coordinates $\hat{P}_p^v$ of the pedestrian 2 with respect to the second coordinate system may be determined through coordinate transformation expressed in Equation 15 below, based on the coordinates $\hat{P}_p^w$ of the pedestrian 2 with respect to the first coordinate system, the coordinates $\hat{P}_v^w$ of the vehicle 1 at a position to which the vehicle 1 is backed up, and the attitude $\hat{\theta}_v^w$ of the vehicle 1 at the position to which the vehicle 1 is backed up with respect to the first coordinate system.

$$\hat{P}_p^v = R(\hat{\theta}_v^w)^T(\hat{P}_p^w - \hat{P}_v^w)$$ [Equation 15]

In this case, $R(\hat{\theta}_v^w)^T$ represents a transposed matrix of a rotation matrix of the attitude $\hat{\theta}_v^w$ of the vehicle 1.

The controller 100 may estimate coordinates $\hat{P}_p^c$ of the pedestrian 2 with respect to the third coordinate system on the basis of the estimated coordinates $\hat{P}_p^v$ of the pedestrian 2 determined by Equation 15.

Referring to FIG. 7, the estimated coordinates $\hat{P}_p^c$ of the pedestrian 2 with respect to the third coordinate system may be determined through coordinate transformation expressed in Equation 16, based on the estimated coordinates P of the pedestrian 2 with respect to the second coordinate system, the coordinates $P_c^v$ of a position at which the rear camera 360 is installed with respect to the second coordinate system, and the attitude $\theta_c^v$ of the rear camera 360 with respect to the second coordinate system.

$$\hat{P}_p^c = R(\theta_c^v)^T (\hat{P}_p^v - P_c^v) \quad \text{[Equation 16]}$$

In this case, $R(\theta_c^v)^T$ represents rotational transformation for rotationally transforming coordinates with respect to the second coordinate system into coordinates with respect to the third coordinate system.

The controller 100 may calculate a distance d between the rear camera 360 and the pedestrian 2 from an inner product of the estimated coordinates $\hat{P}_p^c$ of the pedestrian 2 determined by Equation 16.

That is, the controller 100 calculate the distanced between the rear camera 360 and the pedestrian 2 from a vector of the estimated coordinates $\hat{P}_p^c$ of the pedestrian 2 according to Equation 17 below.

$$\hat{d} = (\hat{P}_p^c \cdot \hat{P}_p^c)^{1/2} \quad \text{[Equation 17]}$$

The controller 100 may accurately determine the position of the pedestrian 2 located on the road with a slope or a gradient by precisely calculating the distance between the rear camera 360 and the pedestrian 2 on the basis of the above-described method.

The controller 100 may determine a risk of collision between the vehicle 1 and the pedestrian 2 and transmit a collision warning signal when the calculated distance between the rear camera 360 and the pedestrian 2 is less than a predetermined value. The notification unit 60 of the vehicle 1 may inform a driver of the risk of collision with the pedestrian 2 behind the vehicle 1 by outputting the collision warning signal on the basis of the collision warning signal transmitted from the controller 100.

The collision warning signal may be output in the form of a sound, or may be visually output through a display unit or an audio-video-navigation (AVN) system included in the vehicle 1.

Furthermore, the controller 100 may control the speed adjustor 70 to transmit a signal for braking the vehicle 1 which is backing up when the calculated distance between the rear camera 360 and the pedestrian 2 is less than the predetermined value. The speed adjustor 70 may decrease the speed of the vehicle 1 which is backing up or stop the backing up of the vehicle 1 on the basis of the signal transmitted from the controller 100, thereby inhibiting or preventing a collision between the vehicle 1 and the pedestrian 2 behind the vehicle 1.

The outputting of the collision warning signal indicating the risk of collision between the vehicle 1 and the pedestrian 2 behind the vehicle 1 or controlling the braking of the vehicle 1 is based on a general collision avoidance control or parking collision prevention assistance system when the vehicle 1 is backing up.

Figure 9:
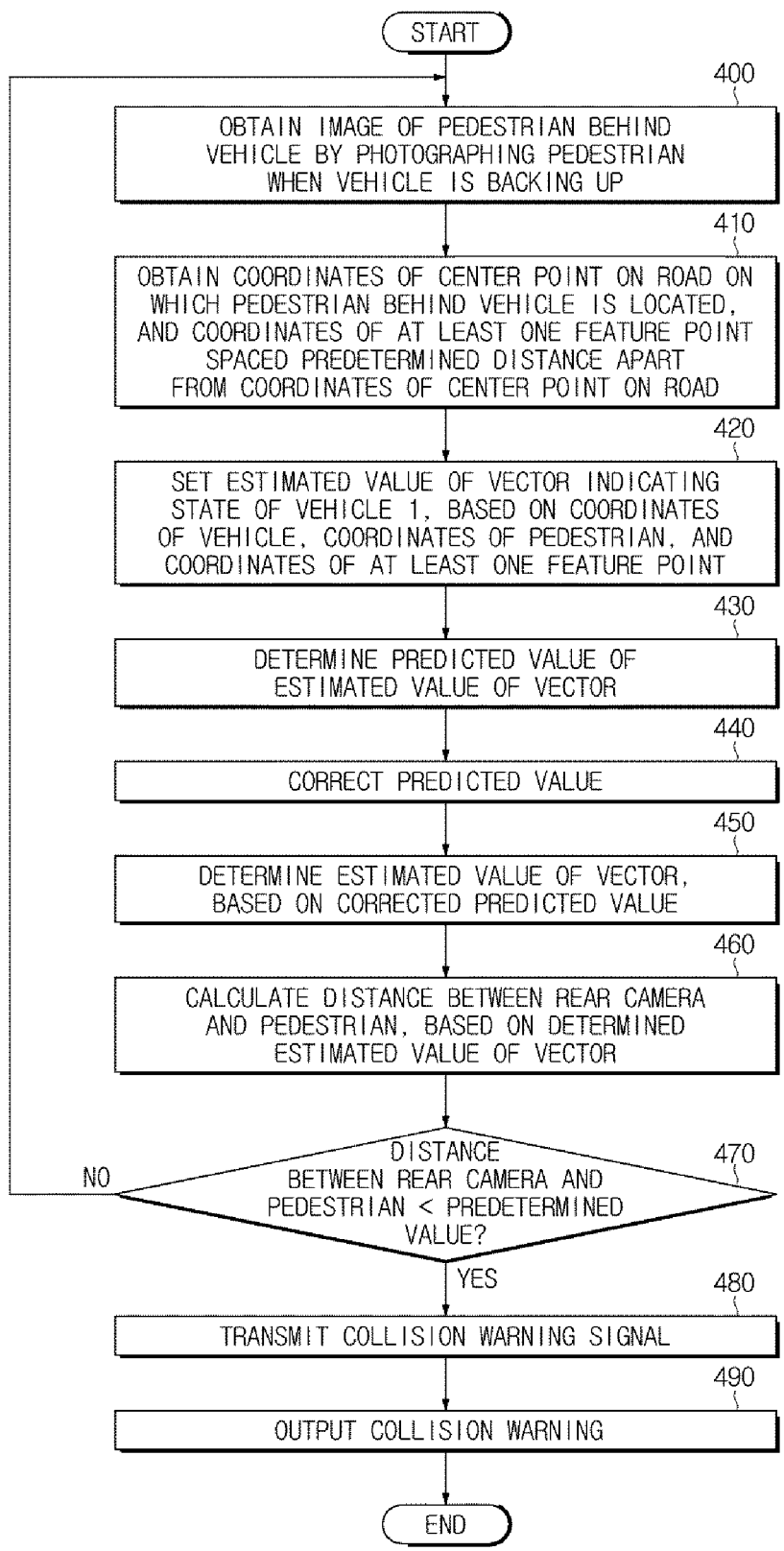
FIG. 9 is a flowchart of a method of controlling a vehicle.

FIG. 9 is a flowchart of a method of controlling a vehicle in one form.

Referring to FIG. 9, the rear camera 360 of the vehicle 1 may obtain an image of an object behind the vehicle 1 by photographing the object when the vehicle 1 is backing up (400). As described above, there may be various objects, such as a pedestrian, a bicycle, other vehicles, and other obstacles, but it is assumed that the object is a pedestrian in one form of the present disclosure.

The rear camera 360 may obtain coordinates of a center point on the road on which the pedestrian 2 behind the vehicle 1 is located, and coordinates of at least one feature point spaced a predetermined distance apart from the coordinates of the center point on the road (410).

The controller 100 may set an estimated value of a vector indicating a state of the vehicle 1 on the basis of coordinates of the vehicle 1, coordinates of the pedestrian 2, and the coordinates of the at least one feature point (420).

The controller 100 may determine a predicted value of the set estimated value of the vector on the basis of a result of differentiating the estimated value of the vector with respect to time (430). The controller 100 may correct the determined predicted value on the basis of the coordinates of the pedestrian 2 and the coordinates of the at least four feature points obtained by the rear camera 360 (440). In this case, the controller 100 may use the Kalman filter.

The controller 100 may determine the estimated value of the vector on the basis of the corrected predicted value (450), and precisely calculate the distance between the rear camera 360 and the pedestrian 2 on the basis of the determined estimated value of the vector (460).

The controller 100 may determine whether the calculated distance between the rear camera 360 and the pedestrian 2 is less than a predetermined value (470), and transmit a collision warning signal when it is determined that the calculated distance between the rear camera 360 and the pedestrian 2 is less than the predetermined value (480).

The notification unit 60 may output a collision warning on the basis of the collision warning signal transmitted from the controller 100 to inform a driver of a risk of collision with the pedestrian 2 behind the vehicle 1 (490).

As is apparent from the above description, the distance between a vehicle and a pedestrian located behind the vehicle and on the road with a slope or a gradient may be accurately estimated to inhibit or prevent a collision between the vehicle and the pedestrian when the vehicle is backing up.

The forms set forth herein may be realized in a recording medium having recorded thereon instructions which may be executed in a computer. The instructions may be stored in the form of program code, and a program module may be generated to realize these forms when the instructions are executed by a processor. The recording medium may be implemented as a non-transitory computer-readable recording medium.

Examples of the non-transitory computer-readable recording medium include all recording media capable of storing data that is read by a computer, e.g., a ROM, a RAM, a magnetic tape, a magnetic disk, a flash memory, an optical data storage device, etc.

Although a few forms of the present disclosure have been described with reference to the accompanying drawings, it will be appreciated by those skilled in the art that changes may be made in these forms without departing from the principles and spirit of the disclosure. The forms should be considered in descriptive sense only and not for purposes of limitation.

What is claimed is:

1. A vehicle comprising:
   a camera configured to obtain an image of an object behind the vehicle, and obtain coordinates of at least one feature point spaced a predetermined distance from the object;
   a controller configured to:
      establish an estimated value of a vector indicating a state of the vehicle based on coordinates of the vehicle, coordinates of the object, and the coordinates of the at least one feature point, determine a differential value of the estimated value of the vector based on a backing up speed of the vehicle, a yaw, a distance of an axle of a wheel, and a steering angle, determine a predicted value of the estimated value of the vector based on the differential value of the estimated value of the vector, correct the predicted value of the estimated value of the vector based on the coordinates of the object and the coordinates of the at least one feature point obtained by the camera, determine the estimated value of the vector based on the corrected predicted value of the estimated value of the vector, calculate a distance between the camera and the object based on the determined estimated value of the vector, determine the predicted value of the estimated value of the vector and a predicted value of a covariance matrix indicating the state of the vehicle based on the determined differential value, and transmit a collision warning signal based on the calculated distance; and a notification unit configured to output a collision warning based on the transmitted collision warning signal.

2. The vehicle according to claim 1, wherein the camera is configured to obtain coordinates of a road on which the object is located and coordinates of at least one feature point spaced a predetermined distance from the coordinates of the road.

3. The vehicle according to claim 1, wherein the controller is configured to establish a first coordinate system with a center which is the same as a center of the axle of the wheel of the vehicle at a position at which the camera starts sensing the object behind the vehicle when the vehicle moves backward, establish a second coordinate system with a center, and establish a third coordinate system relative to the first coordinate system and based on a position of the camera, and wherein the center of the second coordinate system is established at a position where the center of the wheel is located close to the object with a predetermined distance after the vehicle moves backward.

4. The vehicle according to claim 3, wherein the controller is configured to determine the coordinates of the object and the coordinates of the at least one feature point with respect to the first coordinate system of the vehicle.

5. The vehicle according to claim 3, wherein the controller is configured to determine a roll, a pitch, and a yaw of the vehicle with respect to the first coordinate system of the vehicle.

6. The vehicle according to claim 1, wherein the controller is configured to:

determine a measured value of a position vector of the object based on the coordinates of the object obtained by the camera, determine a measured value of a position vector of the at least one feature point based on the coordinates of the at least one feature point obtained by the camera, and determine a measured value of a height of a road on which the object is located based on an average value of height components of the coordinates of the at least one feature point obtained by the camera.

7. The vehicle according to claim 6, wherein the controller is configured to determine the measured value of the position vector of the object with respect to a third coordinate system of the vehicle.

8. The vehicle according to claim 6, wherein the controller is configured to determine the measured value of the position vector of the at least one feature point with respect to a third coordinate system of the vehicle.

9. The vehicle according to claim 6, wherein the controller is configured to determine the measured value of the height of the road on which the object is located based on the average value of the height components of the coordinates of the at least one feature point with respect to a first coordinate system of the vehicle.

10. The vehicle according to claim 6, wherein the controller is configured to correct an error of the predicted value of the estimated value of the vector and an error of the predicted value of the covariance matrix indicating the state of the vehicle based on the measured value of the position vector of the object, the measured value of the position vector of the at least one feature point, and the measured value of the height of the road on which the object is located.

11. The vehicle according to claim 3, wherein the controller is configured to determine the coordinates of the object with respect to the second coordinate system, based on the determined estimated value of the vector.

12. The vehicle according to claim 11, wherein the controller is configured to determine the coordinates of the object with respect to the third coordinate system based on the coordinates of the object determined with respect to the second coordinate system and coordinates of the camera.

13. The vehicle according to claim 12, wherein the controller is configured to calculate the distance between the camera and the object from an inner product of the coordinates of the object determined with respect to the third coordinate system.

14. The vehicle according to claim 1, wherein the controller is configured to transmit the collision warning signal when the calculated distance between the camera and the object is less than a predetermined value.

15. The vehicle according to claim 1, wherein the controller is configured to transmit a control signal for decreasing a backing up speed of the vehicle when the calculated distance between the camera and the object is less than a predetermined value.

16. The vehicle according to claim 1, wherein the camera is a rear camera configured to obtain coordinates of at least four feature points spaced a predetermined distance apart from the object, and the controller is configured to:

determine the estimated value of the vector indicating the state of the vehicle based on the coordinates of the vehicle, the coordinates of the object, and the coordinates of the at least four feature points, determine the predicted value of the estimated value of the vector with respect to time, correct the predicted value of the estimated value of the vector based on the coordinates of the object and the coordinates of the at least four feature point obtained by the rear camera, determine the estimated value of the vector based on the corrected predicted value of the estimated value of the vector, calculate a distance between the rear camera and the object based on the determined estimated value of the vector, and transmit the collision warning signal on the basis of the calculated distance.

17. A method of controlling a vehicle, comprising:

obtaining, by a rear camera, an image of an object behind a vehicle which is backing up by photographing the object;

obtaining, by the camera, coordinates of at least one feature point spaced a predetermined distance from the object;

establishing, by a controller, an estimated value of a vector representing a state of the vehicle based on coordinates of the vehicle, coordinates of the object, and the coordinates of the at least one feature point;

determining a differential value of the estimated value of the vector based on a backing up speed of the vehicle, a yaw, a distance of an axle of a wheel, and a steering angle;

determining, by the controller, a predicted value of the estimated value of the vector and a predicted value of a covariance matrix indicating the state of the vehicle based on the differential value of the estimated value of the vector;

correcting, by the controller, the predicted value of the estimated value of the vector based on the coordinates of the object and the coordinates of the at least one feature point obtained by the rear camera;

determining, by the controller, the estimated value of the vector based on the corrected predicted value of the estimated value of the vector based, and calculating a distance between the rear camera and the object based on the determined estimated value of the vector; and transmitting, by the controller, a collision warning signal when the calculated distance is less than a predetermined value; and outputting, by a notification unit, a collision warning based on the transmitted collision warning signal.

* * * * *